United States Patent
Kashima et al.

(10) Patent No.: US 9,136,717 B2
(45) Date of Patent: Sep. 15, 2015

(54) SEMICONDUCTOR INTEGRATED CIRCUIT

(75) Inventors: Kyouichi Kashima, Ota (JP); Yoshitaka Fukushima, Mizuho (JP); Masahiro Ono, Isesaki (JP); Tetsuro Hirano, Ora-gun (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 198 days.

(21) Appl. No.: 13/040,891

(22) Filed: Mar. 4, 2011

(65) Prior Publication Data

US 2011/0235224 A1 Sep. 29, 2011

(30) Foreign Application Priority Data

Mar. 26, 2010 (JP) ................................ 2010-071309
Mar. 26, 2010 (JP) ................................ 2010-071310

(51) Int. Cl.
  *H02H 3/00* (2006.01)
  *H02H 7/00* (2006.01)
  *H02J 7/00* (2006.01)
  *H02H 9/00* (2006.01)
  *H02H 3/20* (2006.01)
  *H02H 9/04* (2006.01)
  *H02H 3/22* (2006.01)

(52) U.S. Cl.
  CPC .................................. *H02J 7/0016* (2013.01)

(58) Field of Classification Search
  CPC ............................. H02J 7/00162; H02J 7/0016
  USPC ....................................................... 361/56, 62
  See application file for complete search history.

(56) References Cited

U.S. PATENT DOCUMENTS

| | | | | | |
|---|---|---|---|---|---|
| 5,818,201 | A | * | 10/1998 | Stockstad et al. | 320/119 |
| 6,327,125 | B1 | * | 12/2001 | Colclaser et al. | 361/56 |
| 6,768,617 | B2 | * | 7/2004 | Marr | 361/56 |
| 7,072,158 | B2 | * | 7/2006 | Wang | 361/56 |
| 7,656,126 | B2 | * | 2/2010 | Sato | 320/134 |
| 2008/0170342 | A1 | * | 7/2008 | Osamura | 361/56 |
| 2008/0284375 | A1 | * | 11/2008 | Nagaoka et al. | 320/116 |
| 2009/0323236 | A1 | * | 12/2009 | Morishita | 361/56 |
| 2010/0287389 | A1 | * | 11/2010 | Gangsto et al. | 713/300 |
| 2011/0080140 | A1 | * | 4/2011 | Hogari et al. | 320/134 |

FOREIGN PATENT DOCUMENTS

| JP | 2001-267496 | 9/2001 |
|---|---|---|
| JP | 2009-104455 | 5/2009 |

* cited by examiner

*Primary Examiner* — Thienvu Tran
*Assistant Examiner* — Lucy Thomas

(57) ABSTRACT

A circuit device connected between a neighboring pair of terminals in a semiconductor integrated circuit is protected from electrostatic damage due to a surge voltage when the surge voltage is applied between the neighboring pair of terminals. The semiconductor integrated circuit is formed to include terminals P0-P14, MOS transistors MN0-MN15 in diode connection, protection diode circuits HD0-HD14, MOS transistors T1-T14 for discharging electricity from batteries, a battery voltage detection control circuit and a clamp circuit for overvoltage protection. Each of the MOS transistors T1-T14 for discharging electricity from the batteries is connected between each neighboring pair of the terminals P0-P14 through wirings. Each of the MOS transistors MN1-MN14 in diode connection is connected between each neighboring pair of the terminals.

19 Claims, 3 Drawing Sheets

SEMICONDUCTOR INTEGRATED CIRCUIT

CROSS-REFERENCE OF THE INVENTION

This application claims priority from Japanese Patent Application Nos. 2010-071309 and 2010-071310, the contents of which are incorporated herein by reference in their entirety.

BACKGROUND OF THE INVENTION

1. Field of the Invention

This invention relates to a semiconductor integrated circuit provided with an overvoltage protection circuit.

2. Description of the Related Art

In recent years, there have been developed various kinds of equipment and a charger using a rechargeable battery such as a lithium ion battery. Accordingly, there has been developed a semiconductor integrated circuit that detects voltages of a plurality of batteries connected in series and controls the voltages of the batteries based on the detected voltages.

In this kind of semiconductor integrated circuit, there is provided a protection circuit to protect internal circuits from an overvoltage due to a surge voltage applied to an input terminal, as well as a clamp circuit provided between a power supply line and a ground.

Japanese Patent Application Publication No. 2001-267496 discloses a semiconductor integrated circuit in which a plurality of input terminals shares a single protection circuit to reduce a size of the circuit. Japanese Patent Application Publication No. 2009-104455 discloses a semiconductor integrated circuit that has a clamp circuit that is provided between a power supply line and a ground and takes a reduced circuit area.

In the semiconductor integrated circuit for the battery control described above, however, there is a case in which a circuit device is connected between a neighboring pair of terminals. For example, a switching device is connected between the neighboring pair of input terminals in order to discharge electricity from the battery. When the switching device is turned on, a positive terminal and a negative terminal of the battery are short-circuited to discharge electricity, and a voltage of the battery is reduced. There is a problem with the semiconductor integrated circuit as described above that the switching device is damaged when a surge voltage is applied between the input terminals.

SUMMARY OF THE INVENTION

This invention is directed to solving the problem addressed above, and provides a semiconductor integrated circuit having a plurality of terminals, between each neighboring pair of which a battery is connected, a circuit device connected between the neighboring pair of terminals, and an overvoltage protection device to protect the circuit device from an overvoltage applied between the neighboring pair of terminals.

This invention also provides a semiconductor integrated circuit having first, second and third terminals, a first battery being connected between the first terminal and the second terminal, a second battery being connected between the second terminal and the third terminal, a first circuit device connected between the first terminal and the second terminal, a first overvoltage protection device connected between the first terminal and the second terminal to protect the first circuit device from an overvoltage, a second circuit device connected between the second terminal and the third terminal, a second overvoltage protection device connected between the second terminal and the third terminal to protect the second circuit device from an overvoltage, a protection diode circuit connected to the second terminal, and a third overvoltage protection device connected between the first terminal and the third terminal.

DETAILED DESCRIPTION OF THE INVENTION

Figure 1:
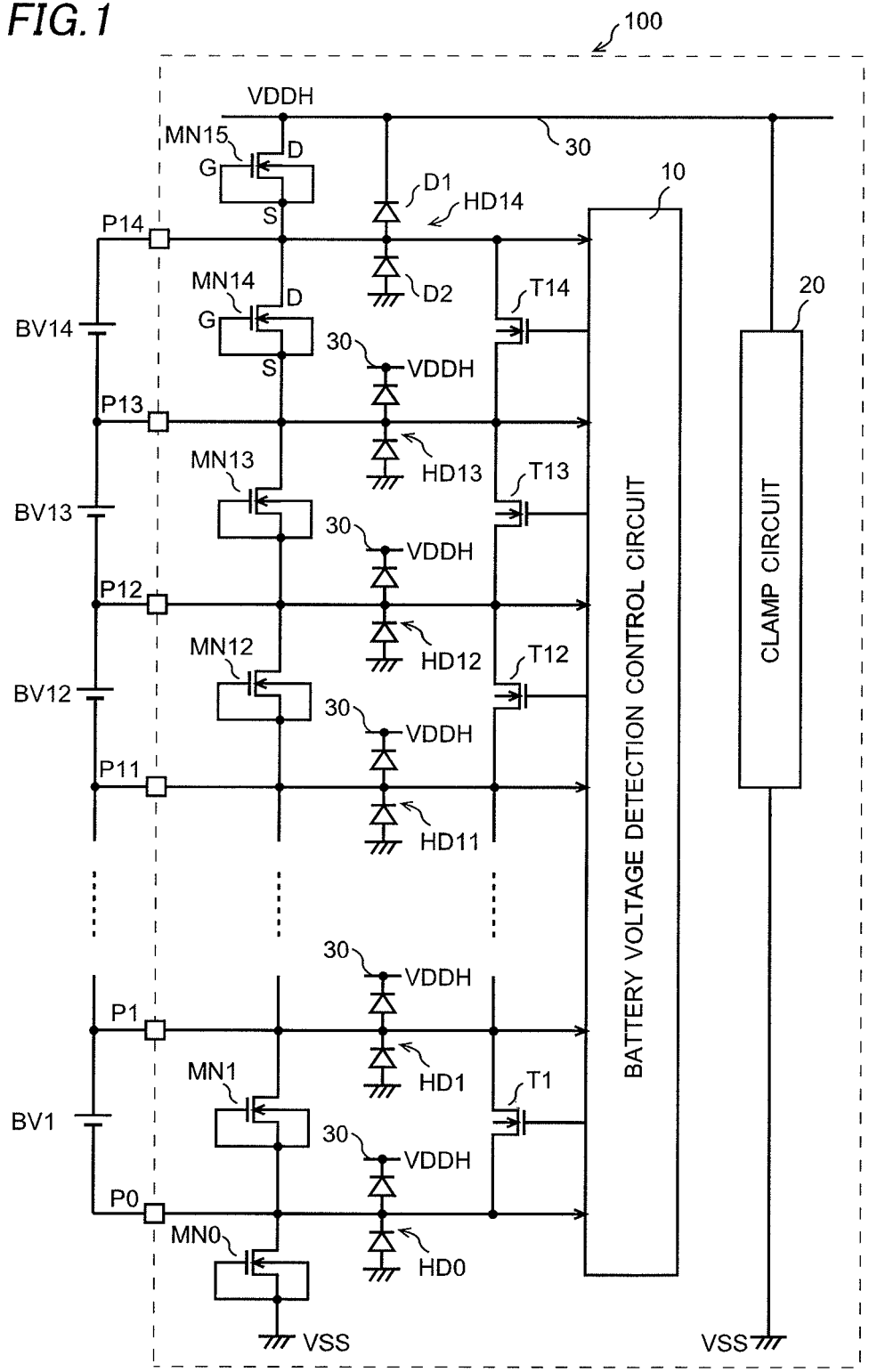
FIG. 1 is a circuit diagram of a semiconductor integrated circuit according to a first embodiment of this invention.
Figure 2:
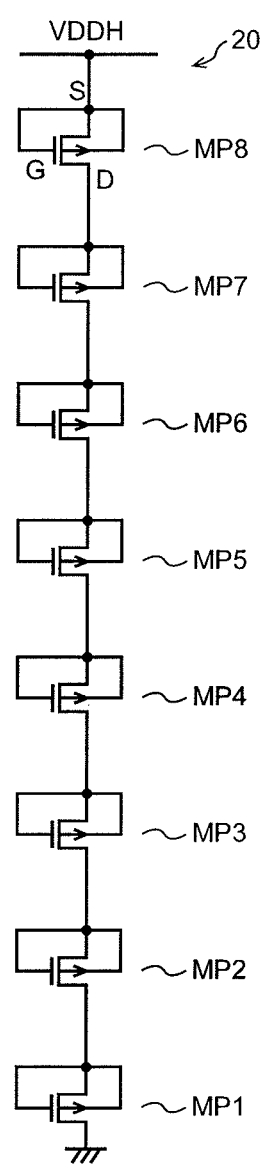
FIG. 2 is a circuit diagram of a clamp circuit.

A semiconductor integrated circuit 100 according to a first embodiment of this invention is described referring to FIG. 1 and FIG. 2. The semiconductor integrated circuit 100 is formed to include terminals P0-P14, MOS transistors MN0-MN15 in diode connection (an example of "overvoltage protection devices" of this invention), protection diode circuits HD0-HD14, MOS transistors T1-T14 for discharging electricity from a battery (an example of "circuit devices" or "switching devices" of this invention), a battery voltage detection control circuit 10 and a clamp circuit 20 for overvoltage protection. The terminals P2-P10 and corresponding circuits are omitted from FIG. 1 for the sake of simplicity.

In the semiconductor integrated circuit 100, there is an array of cells each composed of a circuit (the MOS transistor MN14, the MOS transistor T14 for discharging electricity from the battery and the like, for example) formed corresponding to a neighboring pair of terminals (the terminal P14 and the terminal P13, for example).

Each of batteries BV1-BV14 such as lithium ion batteries is connected between each neighboring pair of the terminals P0-P14. That is, a positive terminal of the battery BV14 is connected to the terminal P14, while a negative terminal of the battery BV14 is connected to the terminal P13, for example. Also, a positive terminal of the battery BV13 is connected to the terminal P13, while a negative terminal of the battery BV13 is connected to the terminal P12. The batteries BV1-BV14 are placed outside the semiconductor integrated circuit 100, and are connected in series to generate a high voltage.

Each of the MOS transistors T1-T14 for discharging electricity from the battery is connected between each neighboring pair of the terminals P0-P14 through wirings. For example, the MOS transistor T14 for discharging electricity from the battery is connected between the terminal P14 and the terminal P13, while the MOS transistor T13 for discharging electricity from the battery is connected between the terminal P13 and the terminal P12.

The battery voltage detection control circuit 10 is structured to detect a voltage of each of the batteries BV1-BV14 by detecting a voltage between each neighboring pair of the terminals P0-P14 and to control turning on/off of the MOS transistors T1-T14 for discharging electricity from the battery based on results of the detection.

That is, when the battery voltage detection control circuit 10 detects that the voltage of one of the batteries BV1-BV14 is higher than the voltage of the other battery, the battery voltage detection control circuit 10 turns on one of the MOS transistors T1-T14 for discharging electricity from the battery connected between corresponding pair of the terminals. Since the positive terminal and the negative terminal of the battery are short-circuited as a result, electricity is discharged from the battery to reduce its voltage.

For example, when the battery voltage detection control circuit 10 detects that the voltage of the battery BV14 is higher than the voltage of the battery BV13, the battery voltage detection control circuit 10 turns on the MOS transistor T14 for discharging electricity from the battery connected between the terminal P14 and the terminal P13. As a result, the voltages of the batteries BV1-BV14 can be made uniform.

Each of the MOS transistors MN0-MN15 in diode connection is made of an N channel type MOS transistor of a low withstand voltage, such as a withstand voltage of 5 V, with its gate G, source S and back gate being connected to each other, and serves as a diode that is composed of an anode made of the source S and a cathode made of a drain D of the MOS transistor. Each of the MOS transistors MN1-MN14 is connected between each neighboring pair of the terminals P0-P14 through wirings.

For example, the MOS transistor MN14 is connected between the terminal P14 and the terminal P13 through wirings, while the MOS transistor MN13 is connected between the terminal P13 and the terminal P12 through wirings. While each of the MOS transistors MN0-MN15 is turned off normally, it becomes conductive to protect corresponding each of the MOS transistors T1-T14 for discharging electricity from the battery when a surge voltage is applied to corresponding each neighboring pair of the terminals. The N channel type MOS transistors MN0-MN15 are preferable as the overvoltage protection devices, although diodes or P channel type MOS transistors may be used in place of them. That is because the N channel type MOS transistors MN0-MN15 have higher current drive capability and are more suitable to reduce the surge voltage quickly.

The MOS transistor MN15 is connected between the terminal P14 and a power supply line 30. The terminal P14 and the power supply line 30 are connected through a wiring outside the semiconductor integrated circuit 100 in normal use. In this case, the MOS transistor MN15 is used to protect the semiconductor integrated circuit 100 from electrostatic damage due to a surge during assembly to mount the semiconductor integrated circuit 100 in a package. The MOS transistor MN15 does not work as an electrostatic damage protection device after the terminal P14 and the power supply line 30 are short-circuited by the connection.

Each of the protection diode circuits HD0-HD14 is connected to each of the terminals P0-P14 through a wiring, respectively. Each of the protection diode circuits HD0-HD14 is provided with a first diode D1 connected between each terminal PX (X=0-14) and the power supply line 30 and a second diode D2 connected between the terminal PX and the ground. In this case, it is necessary that the first diode D1 and the second diode D2 are high withstand voltage diodes, since a high voltage VDDH is applied to the first diode D1 and the second diode D2 connected in series.

The clamp circuit 20 clamps the electric potential VDDH on the power supply line 30 when the surge voltage is applied, and is formed of eight low withstand voltage MOS transistors MP1-MP8 connected in series as shown in FIG. 2, for example. A gate, a source and a back gate of each of the MOS transistors MP1-MP8 are connected to each other. In this case, it is preferable that the MOS transistors MP1-MP8 are formed of P channel type so that a latch up phenomenon is prevented.

Protecting operations in the case where the surge voltage is applied to the semiconductor integrated circuit 100 are hereafter described.

(1) In the case where the surge voltage is applied between the neighboring pair of terminals:

Suppose the surge voltage (several hundred volts, for example) is applied between the terminal P14 and the terminal P13, for example. In the case where an electric potential at the terminal P13 becomes higher than an electric potential at the terminal P14 due to a polarity of the surge voltage, the MOS transistor MN14 in diode connection is forward-biased to be turned on. In the case where the electric potential at the terminal P14 becomes higher than the electric potential at the terminal P13, on the other hand, the MOS transistor MN14 becomes conductive as a result of an avalanche breakdown because a reverse bias is applied to it.

Since a resulting surge current flowing through the MOS transistor MN14 quickly reduces the surge voltage between the terminal P14 and the terminal P13, the MOS transistor T14 for discharging electricity from the battery connected between the terminal P14 and the terminal P13 is prevented from suffering electrostatic damage. The same applies to the case where the surge voltage is applied between other neighboring pair of terminals.

(2) In the case where the surge voltage is applied to one of the terminals:

(a) In the case where the surge voltage that is positive (+) relative to the ground electric potential VSS is applied to each terminal PX:

For example, when the positive surge voltage relative to the ground electric potential VSS is applied to the terminal P14, there is formed a surge current path running from the terminal P14 to the ground through the forward-biased first diode D1 in the protection diode circuit HD14 and the clamp circuit 20. The surge current associated with the surge voltage flows through the surge current path. With this, the internal circuits such as the MOS transistors T1-T14 for discharging electricity from the battery and the battery voltage detection control circuit 10 are protected from electrostatic damage due to the surge voltage. The same applies to each of the other terminals P0-P13.

(b) In the case where the surge voltage that is negative (−) relative to the ground electric potential VSS is applied to each terminal PX:

For example, when the negative surge voltage relative to the ground voltage VSS is applied to the terminal P14, there is formed a surge current path running from the ground to the terminal P14 through the forward-biased second diode D2 in the protection diode circuit HD14. The surge current associated with the surge voltage flows through the surge current path. With this, the internal circuits such as the MOS transistors T1-T14 for discharging electricity from the battery and the battery voltage detection control circuit 10 are protected from damage due to the surge voltage. The same applies to each of the other terminals P0-P13.

(c) In the case where the surge voltage that is positive (+) relative to the electric potential VDDH on the power supply line 30 is applied to each terminal PX:

For example, when the surge voltage that is positive (+) relative to the electric potential VDDH is applied to the terminal P14, there is formed a surge current path running from the terminal P14 to the power supply line 30 through the forward-biased first diode D1 in the protection diode circuit HD14. The surge current associated with the surge voltage flows through the surge current path. With this, the internal circuits such as the MOS transistors T1-T14 for discharging electricity from the battery and the battery voltage detection control circuit 10 are protected from damage due to the surge voltage. The same applies to each of the other terminals P0-P13.

(d) In the case where the surge voltage that is negative (−) relative to the electric potential VDDH on the power supply line 30 is applied to each terminal PX:

For example, when the surge voltage that is negative (−) relative to the electric potential VDDH is applied to the terminal P14, there is formed a surge current path running from the power supply line 30 to the terminal P14 through the clamp circuit 20 and the forward-biased second diode D2 in the protection diode circuit HD14. The surge current associated with the surge voltage flows through the surge current path.

With this, the internal circuits such as the MOS transistors T1-T14 for discharging electricity from the battery and the battery voltage detection control circuit 10 are protected from damage due to the surge voltage. The same applies to each of the other terminals P0-P13.

With the semiconductor integrated circuit 100, the internal circuits such as the MOS transistors T1-T14 for discharging electricity from the battery are protected from the electrostatic damage when the surge voltage is applied between the neighboring pair of the terminals, or to each terminal, as described above.

Although the semiconductor integrated circuit 100 is formed of 14 cells so that the 14 batteries BV1-BV14 can be connected in the embodiment described above, the number of cells may be increased or decreased to the extent that it is equal to or larger than one. Also, although the MOS transistors T1-T14 for discharging electricity from the battery are connected to the neighboring pairs of the terminals in the embodiment described above, other circuit devices may be connected instead of them. Even in that case, the circuit devices can be protected by the MOS transistors MN0-MN15 in diode connection.

A semiconductor integrated circuit 200 according to a second embodiment of this invention will be described referring to FIG. 3. Terminals P3-P9 and corresponding circuits are omitted from FIG. 3 for the sake of simplicity.

The size of the protection circuit in the semiconductor integrated circuit 100 according to the first embodiment is large, because each of the terminals P0-P14 is provided with each of the protection diode circuits HD0-HD14, and besides there is provided the clamp circuit 20.

Thus, while only the protection diode circuits HD1, HD3 HD5, HD7, HD9, HD11 and HD 13 corresponding to odd-numbered terminals such as the terminal P1 are reserved, the protection diode circuits HD0, HD2, HD4, HD6, HD8, HD10, HD12 and HD14 corresponding to the other terminals such as the terminal P0 are removed in order to reduce the size of the circuit in the semiconductor integrated circuit 200 according to the second embodiment. In other words, each of the protection diode circuits is provided to every two terminals, and the number of the protection diode circuits in the second embodiment is reduced to a half of that in the first embodiment.

Besides, the clamp circuit 20 is removed and seven MOS transistors MP11-MP17 in diode connection are provided instead so that surge current paths are secured. With this, it is realized that the size of the circuit is reduced while the overvoltage protection performance is secured. Other circuit structures are the same as those in the first embodiment.

That is, the semiconductor integrated circuit 200 is formed to include the terminals P0-P14, the MOS transistors MN0-MN15 in diode connection (an example of "overvoltage protection devices" of this invention), the protection diode circuits HD1, HD3, HD5, HD7, HD9, HD11 and HD13, the MOS transistors T1-T14 for discharging electricity from the battery (an example of "circuit devices" or "switching devices" of this invention), the battery voltage detection control circuit 10 and the MOS transistors MP11-MP17 in diode connection.

Each of the MOS transistors MP11-MP17 in diode connection is provided to every two cells. In this case, each of the MOS transistors MP11-MP17 is made of a P channel type MOS transistor with its gate G, source S and back gate being connected to each other, and serves as a diode that is composed of a cathode made of the source S and an anode made of a drain D of the MOS transistor.

For example, the MOS transistor MP11 is connected between the ground and the terminal P2 through wirings. The MOS transistor MP16 is connected between the terminal P10 and the terminal P12 through wirings. The MOS transistor MP17 is connected between the terminal P12 and the terminal P14 through wirings. Looked as a whole, the MOS transistors MP11-MP17 are connected between the terminal P14 and the ground in series.

Since a voltage of two batteries connected in series is applied as a reverse bias to each of the MOS transistors MP11-MP17 in diode connection when the batteries BV1-BV14 are connected to the semiconductor integrated circuit 200, each of the MOS transistors MP11-MP17 is required to withstand the voltage of two batteries connected in series. When the surge voltage is applied to each of the terminals, corresponding each of the MOS transistors MP11-MP17 is turned on when forward-biased by the surge voltage, or an avalanche breakdown is caused to it when reverse-biased by the surge voltage, depending on the polarity of the surge voltage.

Although the MOS transistors MP11-MP17 may be formed of N channel type, a latch-up phenomenon can be prevented by forming them of P channel type.

Protecting operations in the case where the surge voltage is applied to the semiconductor integrated circuit 200 are hereafter described.

(3) In the case where the surge voltage is applied between the neighboring pair of terminals:

In this case, the protecting operations in the second embodiment are the same as in the first embodiment. That is, the electrostatic damage on the MOS transistors T1-T14 for discharging electricity from the battery is prevented by providing each of the MOS transistors MN1-MN14 in diode connection between each neighboring pair of the terminals.

(4) In the case where the surge voltage is applied to one of the terminals:

(a) In the case where the surge voltage that is positive (+) relative to the ground electric potential VSS is applied to each terminal PX:

In this case, a surge current path is formed from the terminal PX to the ground with every terminal PX. With this, the internal circuits such as the MOS transistors T1-T14 for discharging electricity from the battery and the battery voltage detection control circuit 10 are protected from electrostatic damage due to the surge voltage.

For example, when the surge voltage that is positive (+) relative to the ground electric potential VSS is applied to the terminal P14, there is formed a surge current path running from the terminal P14 to the ground through the seven MOS transistors MP11-MP17. With the terminal P13, there is formed a surge current path running from the terminal P13 to the ground through the MOS transistor MN13 and the six MOS transistors MP11-MP16.

With the terminal P12, there is formed a surge current path running from the terminal P12 to the ground through the six MOS transistors MP11-MP16. With the terminal P11, there is formed a surge current path running from the terminal P11 to the ground through the MOS transistor MN11 and the five MOS transistors MP11-MP15.

Figure 3:
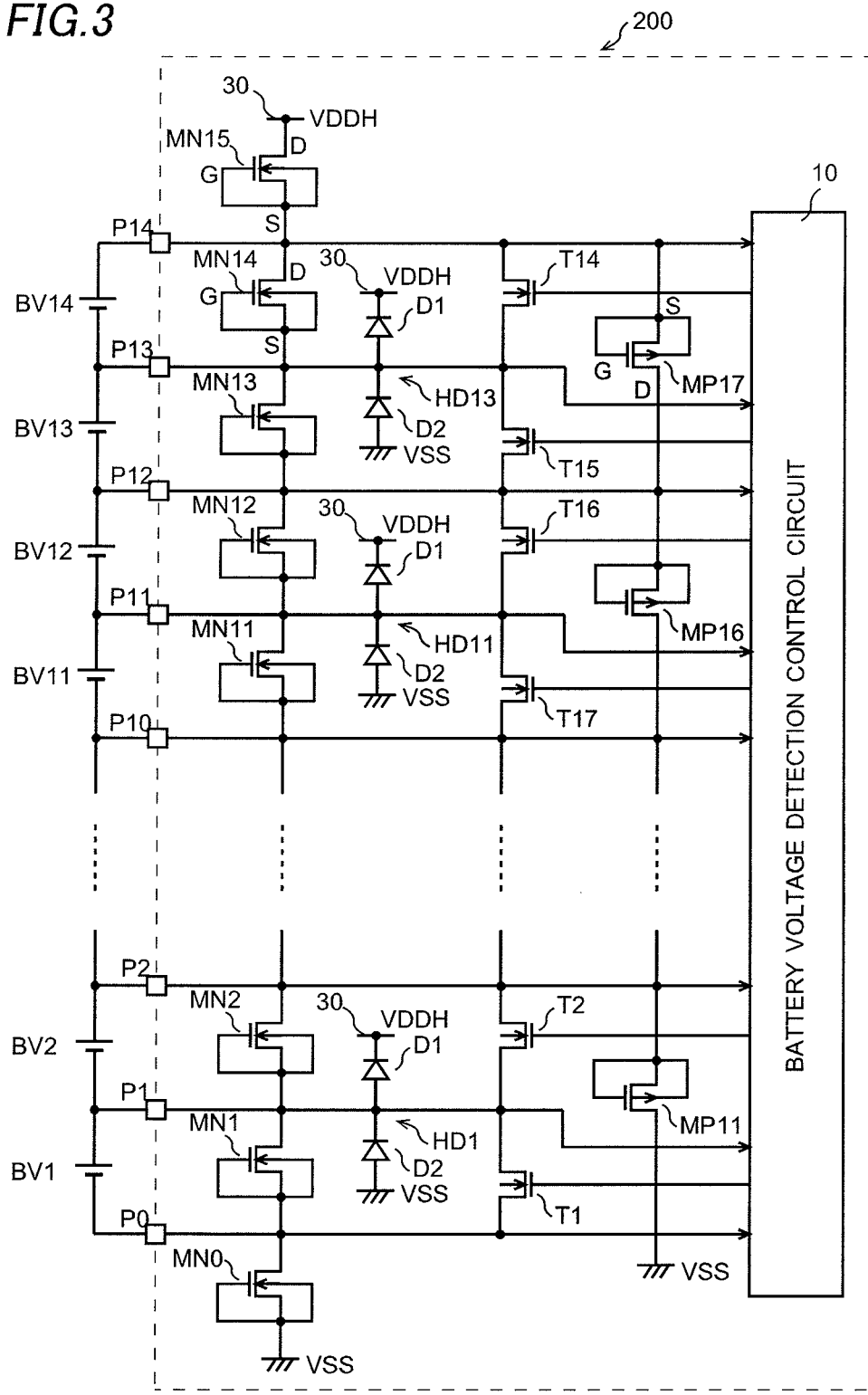
FIG. 3 is a circuit diagram of a semiconductor integrated circuit according to a second embodiment of this invention.

That is, the lower the terminal is located in FIG. 3, the shorter there is formed the surge current path to make it more advantageous in protecting from the electrostatic damage due to the overvoltage. Also, the protection provided in the second embodiment is more advantageous with every terminal PX compared with the protection provided in the first embodiment.

(b) In the case where the surge voltage that is negative (−) relative to the ground electric potential VSS is applied to each terminal PX:

In this case, the protection operations are the same as in the first embodiment with the terminals P1, P3, P5, P7, P9, P11 and P13, because each of the terminals P1, P3, P5, P7, P9, P11 and P13 is provided with each of the protection diode circuits HD1, HD3, HD5, HD7, HD9, HD11 and HD13, respectively. For example, with the terminal P13, there is formed a surge current path running from the ground to the terminal P13 through the forward-biased second diode D2 in the protection diode circuit HD13. The surge current associated with the surge voltage flows through the surge current path.

With the terminal P14, there is formed a surge current path running from the ground to the terminal P14 through the forward-biased second diode D2 in the protection diode circuit HD13 and the MOS transistor MN14. The same applies to each of the terminals P4, P6, P8, P10 and P12. The surge current path is larger in resistance component by a resistance of the MOS transistor MN14, for example, than that in the first embodiment to make it disadvantageous in protecting from the overvoltage.

However, since a surge current path through each of the additional MOS transistors MP11-MP17 is formed in parallel to the surge current path described above with each of the terminals, the overvoltage protection performance with these terminals as a whole in the second embodiment is equivalent to that in the first embodiment.

With the terminal P14, for example, there is additionally provided a surge current path running from the ground to the terminal P14 through the forward-biased second diode D2 in the protection diode circuit HD11, the MOS transistor MN12 and the MOS transistor MP17. There is also provided a surge current path from the ground to the terminal P14 through the seven MOS transistors MP11-MP17.

With the terminal P12, there is additionally provided a surge current path running from the ground to the terminal P12 through the forward-biased second diode D2 in the protection diode circuit HD10, the MOS transistor MN10 and the MOS transistor MP16. There is also provided a surge current path from the ground to the terminal P12 through the six MOS transistors MP11-MP16.

With the terminal P2, there is formed a surge current path running from the ground to the terminal P2 through the single MOS transistor MP11. Since there is also provided a surge current path running from the ground to the terminal P2 through the forward-biased second diode D2 in the protection diode circuit HD1 and the MOS transistor MN2 in addition to the surge current path described above, the overvoltage protection performance with the terminal P2 in the second embodiment is rather more advantageous than that in the first embodiment.

(c) In the case where the surge voltage that is positive (+) relative to the electric potential VDDH on the power supply line 30 is applied to each terminal PX:

In this case, the protection operations are the same as in the first embodiment with the terminals P1, P3, P5, P7, P9, P11 and P13, because each of the terminals P1, P3, P5, P7, P9, P11 and P13 is provided with each of the protection diode circuits HD1, HD3, HD5, HD7, HD9, HD11 and HD13, respectively. With the terminal P13, for example, there is formed a surge current path running from the terminal P13 to the power supply line 30 through the forward-biased first diode D1 in the protection diode circuit HD13. The surge current associated with the surge voltage flows through the surge current path.

With the terminal P12, there is formed a surge current path running from the terminal P12 to the power supply line 30 through the MOS transistor MN13 and the forward-biased first diode D1 in the protection diode circuit HD13. The same applies to each of the terminals P2, P4, P6, P8 and P10.

The surge current path is larger in resistance component by a resistance of the MOS transistor MN13, for example, than that in the first embodiment to make it disadvantageous in protecting from the overvoltage. However, since a surge current path through each of the additional MOS transistors MP11-MP17 is additionally formed in parallel to the surge current path described above with each of the terminals, the overvoltage protection performance with these terminals as a whole in the second embodiment is equivalent to that in the first embodiment.

With the terminal P12, for example, there is additionally provided a surge current path running from the terminal P12 to the power supply line 30 through the MOS transistor MP17 and the MOS transistor MN15.

With the terminal P10, there are additionally provided a surge current path running from the terminal P10 to the power supply line 30 through the MOS transistors MP16, MP17 and the MOS transistor MN15, and a surge current path running from the terminal P10 to the power supply line 30 through the MOS transistor MP16, the MOS transistor MN13 and the forward-biased protection diode D1 in the protection diode circuit HD13.

With the terminal P14, the overvoltage protection performance with the terminal P14 in the second embodiment is rather more advantageous than that in the first embodiment, since there is formed a surge current path running from the terminal P14 to the power supply line 30 through the single MOS transistor MN15.

(d) In the case where the surge voltage that is negative (−) relative to the electric potential VDDH on the power supply line 30 is applied to each terminal PX:

In this case, a surge current path is formed from the power supply line 30 shown in FIG. 3 to the terminal PX with every terminal PX.

For example, in the case where the surge voltage that is negative (−) relative to the electric potential VDDH on the power supply line 30 is applied to the terminal P0, there is formed a surge current path running from the power supply line 30 to the terminal P0 through the MOS transistor MN15, the six MOS transistors MP12-MP17 and the MOS transistors MN1 and MN2.

With the terminal P1, there is formed a surge current path running from the power supply line 30 to the terminal P1 through the MOS transistor MN15, the six MOS transistors MP12-MP17 and the MOS transistor MN2. With the terminal P12, there is formed a surge current path running from the power supply line 30 to the terminal P12 through the MOS transistor MN15 and the MOS transistor MP17. With the terminal P13, there is formed a surge current path running from the power supply line 30 to the terminal P13 through the MOS transistor MN15 and the MOS transistor MN14. With the terminal P14, there is formed a surge current path running from the power supply line 30 to the terminal P14 through the MOS transistor MP15.

That is, the higher the terminal is located in FIG. 3, the lower in resistance there is formed the surge current path to make it more advantageous in protecting from the overvoltage. Also, the protection provided in the second embodiment is more advantageous with every terminal PX compared with the protection provided in the first embodiment.

Although the semiconductor integrated circuit 200 is formed of 14 cells so that 14 batteries BV1-BV14 can be connected in the embodiment described above, the number of cells may be increased or decreased to the extent that it is equal to or larger than two.

With the semiconductor integrated circuit according to the embodiments of this invention, the circuit device connected between neighboring pair of terminals can be protected from the electrostatic damage due to the surge voltage when the surge voltage is applied between the neighboring pair of the terminals.

What is claimed is:

1. A semiconductor integrated circuit, comprising:
a plurality of terminals including at least three terminals forming neighboring pairs of terminals;
a plurality of switching devices arranged such that there is one switching device connected directly between each neighboring pair of terminals;
a battery voltage detection control circuit that detects a voltage between the terminals of each neighboring pair of terminals, wherein in response to the battery voltage detection control circuit detecting that a voltage across a first neighboring pair of terminals is higher than the voltage across a second neighboring pair of terminals, the battery voltage detection control circuit activates the switching device between the first neighboring pair of terminals to reduce the voltage at the first neighboring pair of terminals by discharging the voltage across the pair of terminals;
a plurality of first overvoltage protection devices connected in series, each overvoltage protection device being connected between a corresponding neighboring pair of terminals and protecting a corresponding one of the switching devices from an overvoltage applied between the corresponding neighboring pair of the terminals, wherein each overvoltage protection device is a N-type MOS transistor having a gate and a source connected to each other;
a plurality of second overvoltage protection devices, each of the second overvoltage protection devices being connected between every other terminal; and
a plurality of third overvoltage protection devices or circuits, each of the third overvoltage protection devices or circuits being connected to terminals that are not connected to the plurality of second overvoltage protection devices.

2. The semiconductor integrated circuit of claim 1, further comprising a power supply line and a clamp circuit, the power supply line being connected to one of the plurality of terminals, and the clamp circuit being connected between a ground and the power supply line and clamping an electric potential on the power supply line.

3. The semiconductor integrated circuit of claim 2, wherein the clamp circuit comprises a plurality of MOS transistors connected in series between the power supply line and the ground line, a gate and a source of each of the plurality of MOS transistors being connected to each other.

4. The semiconductor integrated circuit of claim 1, further comprising a power supply line and a plurality of protection diode circuits, the power supply line being connected to one of the plurality of terminals, and each of the protection diode circuits being connected to each of the plurality of terminals, respectively, wherein each of the plurality of protection diode circuits comprises a first diode and a second diode, the first diode being connected between the terminal and the power supply line, and the second diode being connected between the terminal and a ground.

5. A semiconductor integrated circuit, comprising:
a plurality of terminals including at least three terminals forming neighboring pairs of terminals aligned in a line, the terminals comprising odd number terminals that are placed at positions of odd numbers in the line and even number terminals that are placed at positions of even numbers in the line;
a plurality of switching devices, each one of the plurality of switching devices connected between a respective one of a corresponding neighboring pair of the terminals;
a battery voltage detection control circuit that detects a voltage between the terminals of each neighboring pair of terminals and that controls turning on/off of each corresponding switching device according to the voltage between the terminals of the corresponding neighboring pair of terminals to keep the voltages between each neighboring pair of terminals uniform with each other;
a plurality of first overvoltage protection devices connected in series, each of the first overvoltage protection devices being connected between a corresponding neighboring pair of the terminals and protecting a corresponding switching device from an overvoltage applied between the corresponding neighboring pair of terminals;
a plurality of second overvoltage protection devices, each of the second overvoltage protection devices being connected between a corresponding neighboring pair of even number terminals; and
a plurality of protection diode circuits, each of the protection diode circuits being connected only to a corresponding odd number terminal.

6. The semiconductor integrated circuit of claim 5, wherein each of the plurality of first overvoltage protection devices comprises a MOS transistor, a gate and a source of the MOS transistor being connected to each other.

7. The semiconductor integrated circuit of claim 5, further comprising a power supply line and a clamp circuit, the power supply line being connected to one of the plurality of terminals, and the clamp circuit being connected between a ground and the power supply line and clamping an electric potential on the power supply line.

8. The semiconductor integrated circuit of claim 7, wherein the clamp circuit comprises a plurality of MOS transistors connected in series between the power supply line and the ground line, a gate and a source of each of the plurality of MOS transistors being connected to each other.

9. The semiconductor integrated circuit of claim 5, further comprising a first additional one of the plurality of first overvoltage protection devices coupled in series between the plurality of first overvoltage protection devices and a power supply line, and a second additional one of the plurality of first overvoltage protection devices coupled in series between the plurality of first overvoltage protection devices and a ground line.

10. The semiconductor integrated circuit of claim 7, wherein each of the first plurality of overvoltage protection devices include each a N channel type MOS transistor having a drain connected to a first terminal and a gate and a source both connected to a second terminal of a terminal pair.

11. The semiconductor integrated circuit of claim 7, wherein the clamp circuit is coupled between the power supply line and the ground line formed of a plurality of P channel type MOS transistors coupled in series between the power supply line and the ground line, where each P channel type MOS transistor has a source and a gate coupled together.

12. The semiconductor integrated circuit of claim 5, further comprising an overvoltage protection circuit, the overvoltage protection circuit for protecting the semiconductor integrated circuit from electrostatic damage.

13. The semiconductor integrated circuit of claim 5, wherein each of the neighboring pairs of terminals has a first terminal and a second terminal, the semiconductor integrated circuit further comprises a plurality of P channel type MOS transistors coupled between the first terminal of each neighboring pair of terminals and the first terminal of a successive neighboring pair of terminals.

14. A semiconductor integrated circuit, comprising:
   a plurality of terminal pairs, each terminal pair configured to be connected to a rechargeable battery;
   a voltage detection circuit for detecting a voltage across each terminal pair; and
   a plurality of discharge devices connected in series, each discharge device being connected across a terminal pair, wherein in response to the voltage detection circuit detecting that a voltage across a terminal pair is higher than a voltage across a neighboring terminal pair, the discharge device across the terminal pair discharges the rechargeable battery connected to the terminal pair to reduce the voltage at the terminal pair;
   a plurality of first overvoltage protection devices connected in series, each overvoltage protection device being connected between a corresponding neighboring pair of terminals and protecting a corresponding one of the switching devices from an overvoltage applied between the corresponding neighboring pair of the terminals, wherein each overvoltage protection device is a N-type MOS transistor having a gate and a source connected to each other;
   a plurality of second overvoltage protection devices, each of the second overvoltage protection devices being connected between every other terminal; and
   a plurality of third protection devices or circuits, each of the third protection devices or circuits being connected to terminals that are not connected to the plurality of second overvoltage protection devices.

15. The semiconductor integrated circuit of claim 14, wherein the rechargeable battery is discharged to an extent that enables the voltage across the plurality of terminal pairs to remain uniform.

16. The semiconductor integrated circuit of claim 15, wherein each of the second overvoltage protection devices, protects a corresponding discharge device from a voltage surge across the terminal pair.

17. The semiconductor integrated circuit of claim 16, wherein each of the third protection devices or circuits, is connected to one terminal of a the plurality of terminal pairs and to a power supply line for protecting the discharge devices from a voltage surge in a voltage supplied through the power supply line.

18. The semiconductor integrated circuit of claim 17, wherein the plurality of third protection devices or circuits each contain a first diode and a second diode, each first diode being connected to the one terminal of the terminal pair and to the power supply line to provide a first path between the one terminal and the supply line and each second diode being connected to the one terminal of the terminal pair and to ground to provide a second path between the one terminal to ground, the first path and the second path being selectively used by the voltage surge based on a polarity of the supplied voltage.

19. The semiconductor integrated circuit of claim 17, further comprising a clamp circuit, the clamp circuit for clamping the voltage supplied through the power supply line to a particular voltage when a surge voltage is included in the voltage supplied through the supply line.

\* \* \* \* \*